March 27, 1928.  
J. W. BUCK  
SLICING MACHINE  
Original Filed Feb. 27, 1925   2 Sheets-Sheet 1

1,663,543

INVENTOR  
James W. Buck.  
BY Harold D. Penner  
ATTORNEY

March 27, 1928.
J. W. BUCK
1,663,543
SLICING MACHINE
Original Filed Feb. 27, 1925   2 Sheets-Sheet 2
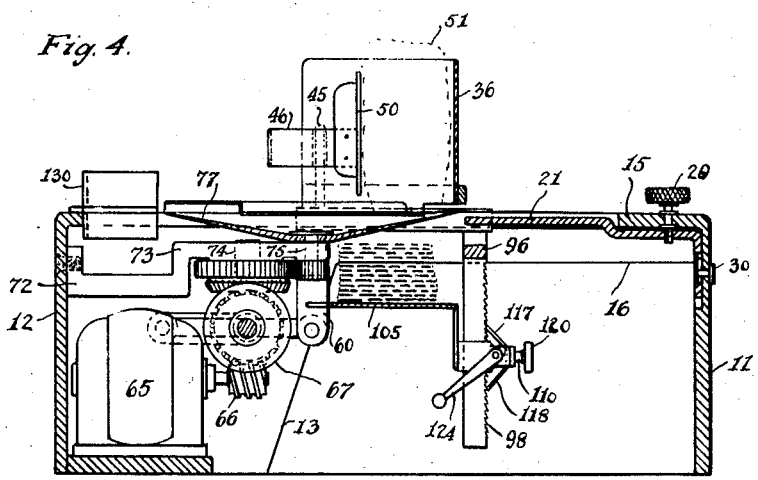
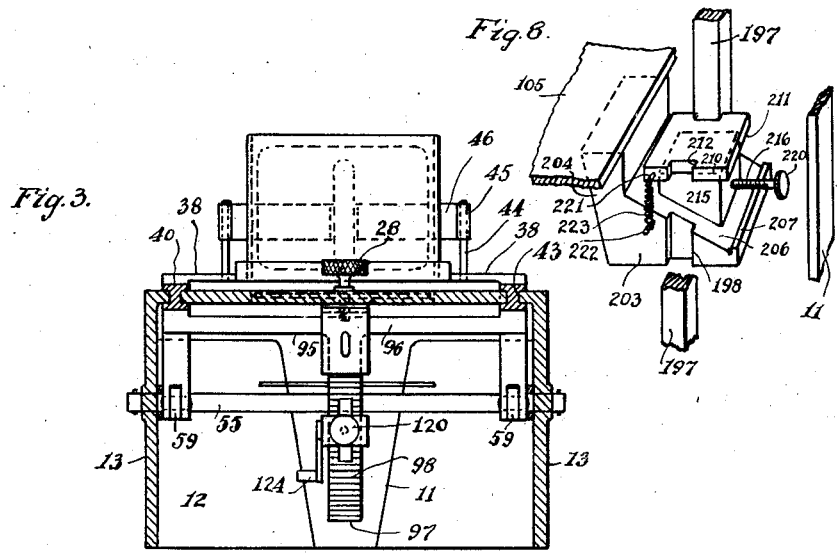
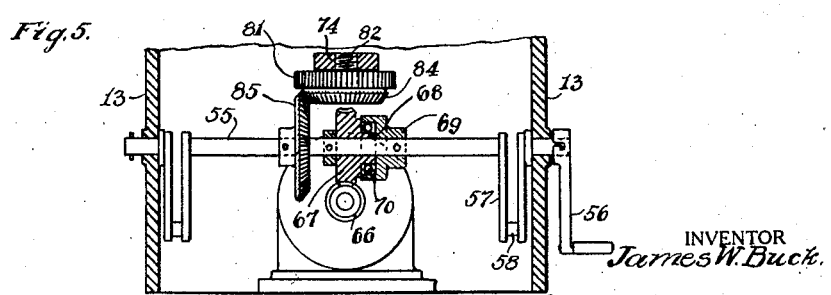
INVENTOR
James W. Buck.
BY
Harold D. Penner
ATTORNEY Patented Mar. 27, 1928.

1,663,543

UNITED STATES PATENT OFFICE.

JAMES W. BUCK, OF NEW YORK, N. Y., ASSIGNOR OF ONE-HALF TO CHARLES L. DEAN, OF NEW YORK, N. Y.

SLICING MACHINE.

Application filed February 27, 1925, Serial No. 12,030. Renewed August 18, 1927.

This invention relates to machines or apparatus or devices for slicing meat or other materials, and it is noted that the invention is not limited to meat slicers, nor in some respects even to slicing machines.

One object of the invention is to provide an apparatus or device of this kind in which the meat or other material may be easily and quickly placed in and removed from the machine, and in which one portion of meat or material may be very quickly interchanged with another without complicated manipulation.

Other objects of the invention are to provide an apparatus or device of this kind in which the thickness of the slices may be easily regulated, and in which the slices as they are cut off are automatically neatly stacked.

Another object of the invention is to provide in an apparatus or device of this kind, a convenient and efficient device for sharpening the slicing blade.

Other objects of the invention are to improve generally the simplicity and efficiency of such devices and to provide devices or apparatus of this kind which are durable, economical to manufacture and operate and which will not get out of order.

Still other objects of the invention will appear as the description proceeds; and while herein details of the invention are described, the invention is not limited to these since many and various changes may be made without departing from the scope of the invention as claimed.

The inventive features for the accomplishment of these and other objects are shown herein in connection with one form of improved slicing machine which, briefly stated, includes a stand comprising a fixed platform provided with an opening therein in which is disposed a disk blade and a vertically adjustable meat supporting platform. A hopper reciprocatory over said adjustable platform and part of the blade is supported on slide blocks guided on the fixed platform, reciprocated as will be explained. A motor driven shaft provided with cranks linked to said blocks reciprocates the hopper and also rotates a vertical blade shaft carrying the disk blade near the edge of said adjustable platform. A bracket secured to said slide blocks comprises a pending rack bar on which is received a slide yoke carrying a stacker table always remaining under the hopper and the meat to receive slices of material as the meat is reciprocated against the edge of the blade and as the slice passes under the blade. Actuating means in said slide yoke and engageable with the rack bar moves the table downward after each slice to accommodate the accumulation of the slices. Also I show a grinder mounted on the fixed platform and having disks at will movable into engagement with the edge of the blade for conveniently sharpening the blade.

Two forms of stacker table actuating means are illustrated.

In the accompanying drawing,

Fig. 3 is a transverse vertical sectional view, partly in elevation, taken on the line 3—3 of Fig. 2, looking in the direction of the arrow of said line;

Fig. 4 is a longitudinal vertical sectional view, taken on the line 2—2 of Fig. 1, but with the movable parts in a different position;

Fig. 5 is a transverse vertical sectional view, taken on the line 5—5 of Fig. 2, but with parts removed and the cranks in a different position.

Fig. 8 is a perspective of another form of stacker table actuating means.

Figure 1:
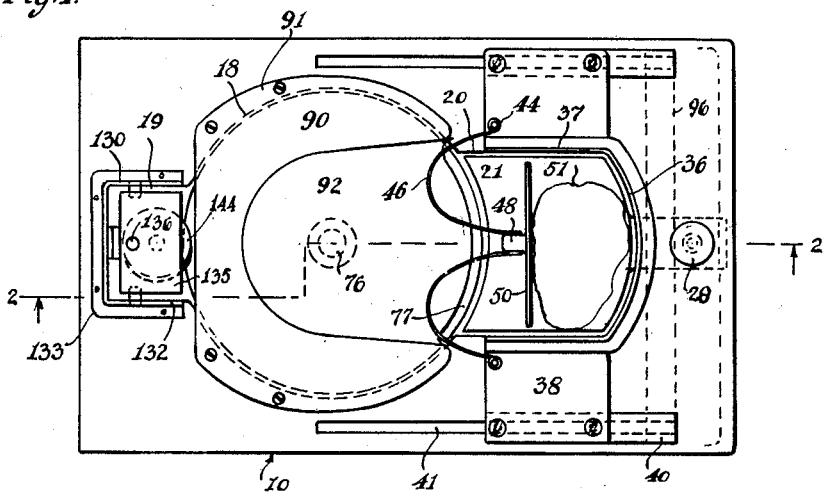
Fig. 1 is a plan of the slicer.

The various parts of my machine are herein shown mounted on a rectangular combined stand and motor housing 10 comprising a leg 11 (Figs. 3 and 4) at the middle of one end, supporting end and side walls 12 and 13 at the other end, and a fixed platform 15 provided with a down-turned flange 16 therearound and a large intramarginal opening consisting of a large intermediate disk receiving portion 18 (Fig. 1), a smaller grinder receiving portion 19 and an adjustable platform receiving portion 20 at the other end.

A meat supporting adjustable platform 21 is disposed in said platform receiving opening and provided with a tongue extension 22 at its front or outer edge disposed under the fixed platform and has a longitudinally slotted downturned end 23 slidably received and guided in a vertical guide recess 24 in said leg. A thumb screw 27 having a plain intermediate portion rotatably mounted in a bore in the fixed platform is provided with an exterior manipulating head 28, and a threaded lower end 29 received in a threaded hole in said extension, whereby the adjustable platform may be raised or lowered to provide for different thicknesses of slices. A rivet 30 passing through said leg and loosely into the slot of said downturned end holds said end against dislocation.

A reciprocatory meat receiving hopper 35 over said adjustable platform comprises an outer and side walls 36 and 37 and horizontal lateral supports 38 (Fig. 1) supported on reciprocatory slide blocks 40 guided in marginal slots or slideways 41 in the fixed platform and each provided with inner grooves 43 (Fig. 3) receiving the edges of the slideways.

A pair of upright rods 44 fast on said supports 38 near the inner end of the side walls pivotally receive the curled outer ends 45 of a pair of sheet metal springs 46 having flat inner ends secured to the side faces of a lug 48 (Fig. 1) on the outer face at the middle of its outer face of a follower 50 in the hopper substantially parallel to the outer wall 36. Said springs tend to straighten and force the follower toward the outer wall 36, thereby to hold the meat 51 or the like against said outer wall.

Figure 2:
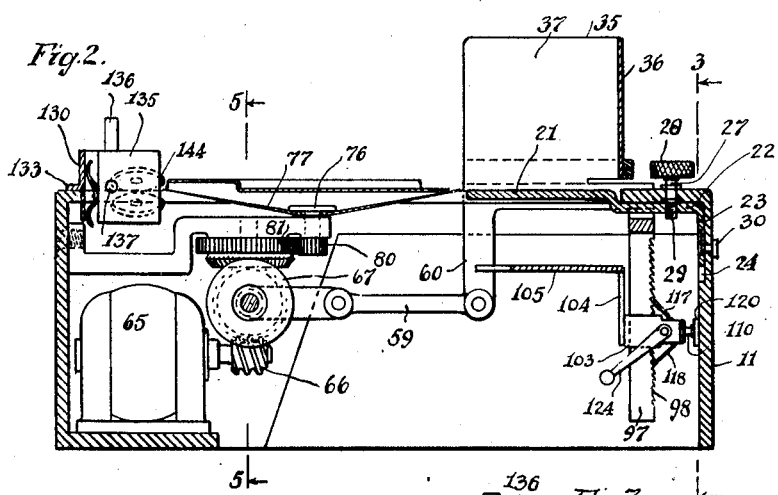
Fig. 2 is a longitudinal vertical sectional view, partly in elevation, showing the slicer with parts in one position of movement, said section being taken on the line 2—2 of Fig. 1, looking in the direction of the arrow of said line.

A main shaft 55 (Fig. 5) rotatably mounted in and projecting from said supporting side walls 13 transverse to the stand under the rear part of the intermediate opening is provided with a handle crank 56 detachably mounted on one of the projecting ends, and near said side walls with intermediate cranks 57 the pins 58 of which are connected by links 59 (Fig. 2) with downward extensions 60 on the blocks 40 whereby the hopper is reciprocated from the main shaft.

A motor 65 (Fig. 4) mounted against the rear end wall of the stand is provided with a worm 66 on its shaft engageable with a worm wheel 67 loosely mounted on the main shaft and provided with a projecting clutch hub 68 (Fig. 5) loosely received in a clutch cup 69 fast on said main shaft and carrying ratchet clutch balls 70 interposed between said hub and cup whereby the main shaft may be driven forward by the motor or may be driven by the crank handle without rotating the motor.

A blade supporting bracket 72 mounted on the end wall 12 comprises an upwardly offset portion 73 provided with inner and outer vertical bores 74 and 75, the latter receiving a headed rotary blade shaft 76 (Fig. 2) carrying a horizontally disposed concavo-convex disk blade 77 mounted on the upper end of the blade shaft with its concaved face uppermost and its edge near and just above the plane of, said adjustable platform 21. A pinion 80 on the lower end of the blade shaft meshes with a spur gear 81 of an idler, on an idler shaft 82 (Fig. 5) fixed in said inner bore 74, and carrying a bevel gear 84 meshing with a miter gear 85 fast on the main shaft whereby the blade is rotated from the motor.

A protecting cover plate 90 (Figs. 1 and 2) disposed over said blade except at the front and rear edges is provided with downwardly offset flanges 91 secured by screws to the fixed platform and with a downwardly offset meat receiving portion 92 disposed over the middle portion of the blade and the portion next to the hopper about level with the cutting edge of the blade, for supporting the uncut meat as the hopper moves it over the blade to the position of Fig. 4, while the slice passes under the blade.

A stacker bracket 95 (Fig. 3) comprising a transverse bar 96 secured to the outer ends of said slide blocks 40 to be reciprocatory therewith and disposed under said tongue extension 22 carries a downwardly extended rack bar 97 provided with ratchet teeth 98 disposed with the edge toward said leg 11 and having downwardly disposed abrupt shoulder faces 99 (Fig. 6) and upper slanting cam faces 100. A slide yoke 103 vertically slidable on said bar is provided with an upturned arm 104 carrying an upwardly offset horizontal stacker table 105 always disposed under the interior of the hopper and moving along with the piece of meat to receive flat thereon the slice of meat as the slice passes under the blade. Said yoke includes a housing portion 106 extended away from said teeth and provided with spaced side walls 107 and an end wall 108 having a bore therein receiving a slide bolt 109 having a threaded outer end 110 and a vertical slot 111 in the inner end face to form spaced ears through which pass a pin 112 disposed across said slot and carrying a pawl spring 115 bent to form intermediately disposed eye 116 embracing said pin and upper and lower arms 117 and 118 extending to the teeth and having their ends engageable against said shoulder faces 99 and slanting faces 100 respectively. An adjusting nut on said threaded outer end 110 engages with said leg 11 when the hopper moves to outermost position, thereby pushing said upper arm 117 against the abrupt face 99 of the adjacent tooth, forcing the slide yoke downward to accommodate successive slices on the accumulating stack of slices on the stacker table, the 'ower arm 118 camming over the slanting faces of the teeth, and both arms cooperating to frictionally hold the stacker table in place.

A pivot shaft 123 passing through the side walls of the housing 106 between said arms 117 and 118 carries a handle 124 on the end of the shaft outside of the housing, and a cam projection 125 mounted on the shaft within the housing and engageable with the upper arm 117 when the handle is raised, thereby to raise the upper arm out of engagement with the teeth to permit raising of the stacker table to near the blade, as when commencing a new stack on the table.

Figure 7:
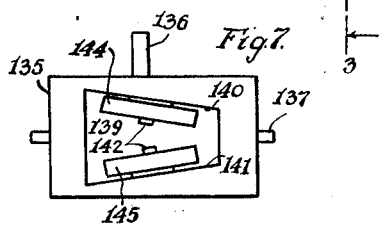
Fig. 7 is an inner side elevation showing the grinder block.

A grinder housing 130 (Figs. 1 and 2) mounted in said grinder opening 19 and comprising an outer and side walls 131 and 132, and an intermediate lateral flange 133 secured on said fixed platform, carries therein a block 135 (Fig. 7) provided with an outwardly projecting handle 136, and a pair of laterally projecting trunnions 137 journaled in the side walls 135. Said block is provided with a large recess 139 opening toward the blade and having upper and lower flat walls 140 and 141 diverging in the direction of motion of the adjacent edge of the blade, and carrying stud shafts 142 mounted in the mid part of said faces and carrying grinding disks 144 and 145, rotatable on said stub shaft and spaced from said faces and respectively projecting slightly above and below the cutting edge of the blade normally out of contact therewith, and respectively engageable with the upper or lower faces of the blade when the handle is moved toward or from the blade, thereby to grind the rotating blade easily and conveniently without removing any part of the machine, or even while the machine is slicing.

The operation of the device is very simple. The scew is manipulated to adjust the adjustable platform the desired distance below the level of the cutting edge of the blade, and the follower is moved away from the opposite walls against the action of the springs to permit the reception of the meat or other material, which is placed in the hopper on the adjustable platform and held pressed against the outer hopper wall by the follower.

The motor or crank handle is then started, and the hopper reciprocates, sliding the piece of meat back and forth against the edge of the blade, the slice passing under the blade onto the stacker table or the preceding slice of meat as the stacker table moves forward with the hopper, the remaining part of the meat as the slice leaves it sliding over the offset portion of the cover plate.

As each slice is laid on the table, the slide bolt comes into engagement with the leg and causes the table to move down an increment, which is controlled by the nut in accordance with the thickness of the slices.

When the required number of slices have been obtained the motor is stopped and the slices are removed from the table, and the handle moved to raise the upper spring arm to permit the table to be raised for the next operation.

Whenever the blade needs sharpening it is only necessary to tilt the handle first one way and then the other to successively bring the grinding disks into engagement with the faces of the cutting portion of the blade while the blade is being rotated.

While the slicing of meat, vegetables and similar materials are particularly mentioned herein, it is noted that other materials may be sliced, and that the grinder is an efficient device without regard to the use to which the blade is put.

Figure 6:
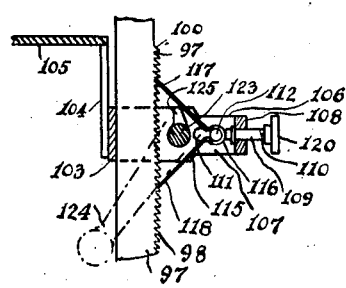
Fig. 6 is a vertical sectional view through the stacker table actuating means.

The stacker table feed of Fig. 8 is entirely frictional to permit the feed to accommodate very thin slices or slices whose thickness has no even relation to interdental distances of the rack teeth of Fig. 6. In this form of the invention the stacker bracket comprising a transverse bar 96 is secured to the slide blocks as in Fig. 3; but instead of the single bar 97 there is a pair of downwardly extended slightly resilient bars 197 of rectangular cross section provided with smooth faces slidably received in lateral recesses 198 of a slide block 203 yieldably held by the resilience of the bars and provided with an upwardly projecting inner end 204 spaced away from said bars, and a smooth top bearing face 206 partly between the bars and downwardly inclined toward said leg and terminating in a stop shoulder 207. The stacker table 105 is mounted on said upturned end 204 and tends by its weight to clutch, or bind, said recesses 198 on the bars. A clutch block 210 disposed a distance above said face has a smooth horizontal lower face 211 and is provided with lateral recesses 212 slidably receiving said bars 197; and an actuating wedge 215 snugly slidably received between said bars 197 and faces 206 and 211 has a threaded bore in its outer end face carrying an adjusting screw 216 received in said bore and having a milled adjusting head 220 engageable with said leg 11 as the hopper reciprocates. Lateral pins 221 and 222 projecting from both sides of said blocks 203 and 210 carry springs tensioned between said pins tending to press down the inner end of the clutch block to clutch the same with the bars.

The wedge 215 serves, when actuated by each engagement of the screw 216 with the leg 11 to force the table downward an increment. When the wedge is against the stop 207, the weight of the table normally tends to hold the block 203 clutched and the wedge tends to hold the outer end of the clutch block 210 up while the springs 223 tend to hold the inner end of the clutch block down, thus tending to lock the clutch block also. When the wedge is moved relatively inward by contact of the screw with the leg 11 the wedge presses upwardly against the outer end of the clutch block 210, locking it more firmly, and downwardly against the outer end of the block 203 thus partially unclutching the lower block to permit it to be forced downward by the inward movement of the wedge a distance depending upon how far the screw 216 sticks out of the wedge. If the screw is screwed far into the wedge, the amount of movement of the wedge is slight, and the table is lowered small distances to accommodate thin slices. If the screw is further out the table will accommodate thicker slices.

When the stacker table itself is raised, causing the block 203 to pivot slightly on its recesses 198, both sets of recesses unclutch permitting the whole to slide up on the bars, for the reception of a new batch of slices on the stacker table.

I claim as my invention:

1. In combination, a meat supporting platform; a reciprocatory hopper over said platform; a rotary disk plate near said platform; a stacker table under the platform; and means for moving the table downward.

2. In combination, a meat supporting platform; a reciprocatory hopper over said platform; a rotary disk blade near the edge of said platform; a downwardly extended rack bar reciprocatory with the carrier; a slide yoke yieldably received on said bar; a stacker table disposed thereon under the carrier; and actuating means for forcing the slide yoke downward to accommodate successive slices on the stacker table.

3. In combination, a supporting platform; a reciprocatory hopper over said platform; a movable blade near the edge of said platform; a stacker table under said platform and reciprocatory therewith; and means for automatically moving the table downward at each reciprocation thereof.

4. In combination, a supporting platform; a reciprocatory hopper over said platform; a movable blade near the edge of said platform; a stacker table under said platform and reciprocatory therewith; and adjustable means for automatically moving the table adjusted increments downward at each reciprocation thereof.

5. In combination, a supporting platform; a reciprocatory hopper over said platform; a movable blade near the edge of said platform; a stacker table under said platform and reciprocatory therewith; actuating means for automatically moving the table downward at each reciprocation thereof; and means for disabling the actuating means.

6. In combination, a vertically adjustable horizontal meat supporting platform; a horizontal rotary disk blade near the edge of said platform; and a hopper having an open bottom and reciprocatory over said platform and blade.

7. In combination, a fixed platform; a meat supporting platform thereon; a reciprocatory meat receiving hopper over said supporting platform having an open side and comprising an outer and side walls and horizontal lateral supports; a vertical follower in said open side; slide blocks guided on said fixed platform and supporting said supports; and a rotary disk blade near said supporting platform.

8. In combination, a stand comprising side walls and a fixed platform provided with an intramarginal opening and a pair of marginal slideway slots; a reciprocatory meat receiving hopper over said adjustable platform and comprising lateral supports; reciprocatory slide blocks guided in said slideways and supporting said lateral supports and each provided with a downward extension on its rear end and with side grooves receiving the edges of the slideways; a main drive shaft rotatably mounted in and projecting from said side walls transverse to the stand under said opening and provided near said side walls with intermediate cranks; links from said downward extensions to said cranks whereby the hopper is reciprocated; and a disk blade in said opening under the path of the hopper and driven from said shaft.

9. In combination, a supporting platform; a reciprocatory hopper over said platform; a main shaft provided with cranks; a handle crank on the main shaft; links from said hopper to said cranks; a motor provided with a worm; a worm wheel loose on the main shaft and engaging said worm; a ratchet clutch member fast on said main shaft and adapted to be clutched to said wheel whereby the main shaft may be driven forward by the motor or the main shaft may be driven by the crank when the motor is stationary; a disk blade near, and just above the plane of said supporting platform; and means whereby the blade is rotated from the main shaft.

10. In combination, a stand comprising a leg at one end and end and side walls at the other end, and a fixed platform provided with an intramarginal opening; a meat supporting platform in said opening; a reciprocatory meat receiving hopper over said supporting platform; a blade supporting bracket mounted on said rear wall and comprising an upwardly offset portion provided with outer and inner vertical bores; a blade shaft rotary in the outer bore; a horizontally disposed concavo-convex disk blade mounted on the upper end of the blade shaft with its concaved face uppermost and its edge near it, and just above the plane of said supporting platform; a pinion on the lower end of the blade shaft; an idler shaft fixed in said inner bore; an idler on said idler shaft comprising a spur gear engaging said pinion and a bevel gear; a main drive shaft; and a miter gear on the main shaft engaged by said bevel gear, whereby the blade is rotated.

11. In combination, a stand comprising supporting means and a fixed platform provided with an intramarginal opening; a meat supporting platform disposed in one end of said opening; a grinder in the other end; a reciprocatory meat receiving hopper over said supporting platform; a rotary disk blade near said supporting platform in said opening, and a cover plate disposed over said blade except at the front and rear edges and provided with downwardly offset flanges secured to the fixed platform and with a downward offset meat receiving portion disposed over the middle portion of the blade and the portion next to the hopper about level with the cutting edge of the blade for supporting the uncut meat as the hopper moves it over the blade.

12. In combination, a stand comprising a fixed platform provided with a grinder opening; a reciprocatory carrier; a movable blade near said carrier; a grinder housing mounted in said grinder opening and comprising an outer and side walls, and an intermediate lateral flange secured on said fixed platform; a block in said grinder housing provided with an upwardly projecting handle, and a pair of laterally projecting trunnions journaled in the side walls; said block being provided at the side toward the blade with a large recess having upper and lower flat walls diverging in the direction of motion of the adjacent edge of the blade; stub shafts mounted in the mid part of the diverged faces; and grinding disks rotatable on said stub shaft spaced from said faces and respectively projecting slightly above and below the cutting edge of the blade normally out of contact therewith, and respectively engageable with the upper and lower faces of the blade when the handle is moved toward or from the blade.

13. In combination, a supporting platform; a reciprocatory hopper over said platform; a movable blade near the edge of said platform; a stacker table under said platform and reciprocatory therewith; and friction means for automatically moving the table downward at each reciprocation thereof.

14. In combination, a reciprocatory carrier; a motor; a drive shaft having a hand crank thereon; means interposed between the shaft and carrier for reciprocating the latter; and a rotary blade near said carrier and operated from said shaft; and a clutch between the motor and shaft whereby said shaft can be rotated by the hand crank while the motor is at rest.

Signed at New York in the county of New York and State of New York this 26th day of February, A. D. 1925.

JAMES W. BUCK.